(12) United States Patent
Akiyama

(10) Patent No.: US 11,947,645 B2
(45) Date of Patent: Apr. 2, 2024

(54) VOICE-BASED AUTHENTICATION AFTER SUCCESSFUL AUTHENTICATION BASED ON NON-VOICE INPUT

(71) Applicant: FUJIFILM BUSINESS INNOVATION CORP., Tokyo (JP)

(72) Inventor: Minoru Akiyama, Yokohama (JP)

(73) Assignee: FUJIFILM Business Innovation Corp., Tokyo (JP)

(*) Notice: Subject to any disclaimer, the term of this patent is extended or adjusted under 35 U.S.C. 154(b) by 433 days.

(21) Appl. No.: 17/177,759

(22) Filed: Feb. 17, 2021

(65) Prior Publication Data
US 2021/0406349 A1    Dec. 30, 2021

(30) Foreign Application Priority Data
Jun. 26, 2020   (JP) ................................ 2020-110697

(51) Int. Cl.
| G06F 21/00 | (2013.01) |
| G06F 21/32 | (2013.01) |
| G10L 17/02 | (2013.01) |
| G10L 25/51 | (2013.01) |

(52) U.S. Cl.
CPC .............. *G06F 21/32* (2013.01); *G10L 17/02* (2013.01); *G10L 25/51* (2013.01)

(58) Field of Classification Search
CPC ....... G06F 21/32; G06F 21/608; G10L 17/02; G10L 25/51; H04N 1/00403; H04N 1/4406
See application file for complete search history.

(56) References Cited

U.S. PATENT DOCUMENTS

| 2007/0168190 A1 | 7/2007 | Itagaki |
| 2020/0195811 A1* | 6/2020 | Otake .................... G10L 17/22 |
| 2020/0366800 A1* | 11/2020 | Nishioka ............ H04N 1/00403 |
| 2021/0294882 A1* | 9/2021 | Shinkawa ............ H04N 1/4406 |

FOREIGN PATENT DOCUMENTS

| JP | 2002-279245 A | 9/2002 |
| JP | 2007/188001 A | 7/2007 |
| JP | 2007-193138 A | 8/2007 |
| JP | 2016-114744 A | 6/2016 |
| JP | 2017-28355 A | 2/2017 |
| JP | 2018-109879 A | 7/2018 |

OTHER PUBLICATIONS

Oct. 3, 2023 Office Action issued in Japanese Patent Application No. 2020-110697.
Jan. 16, 2024 Office Action issued in Japanese Patent Application No. 2020-110697.

* cited by examiner

*Primary Examiner* — Jeffrey C Pwu
*Assistant Examiner* — William A Corum, Jr.
(74) *Attorney, Agent, or Firm* — Oliff PLC

(57) ABSTRACT

An information processing apparatus includes a processor configured to obtain a registered first voice of a first user identified in first authentication achieved by an authentication method different from an authentication method employing a voice, obtain a second voice uttered by a second user during operation, perform second authentication for confirming that the second user is the first user identified in the first authentication by comparing a feature of the first voice and a feature of the second voice, and perform, if the second authentication is successfully completed, a process in accordance with an operation associated with the second voice.

9 Claims, 4 Drawing Sheets

205

| USER ID | FEATURE OF VOICE INDICATING "COPY" | FEATURE OF VOICE INDICATING "PRINT" | FEATURE OF VOICE INDICATING "SCAN" | • • • |
|---|---|---|---|---|
| USER A | [waveform] | [waveform] | [waveform] | • • • |
| USER B | • • • | • • • | • • • | • • • |
| • • • | • • • | • • • | • • • | • • • |

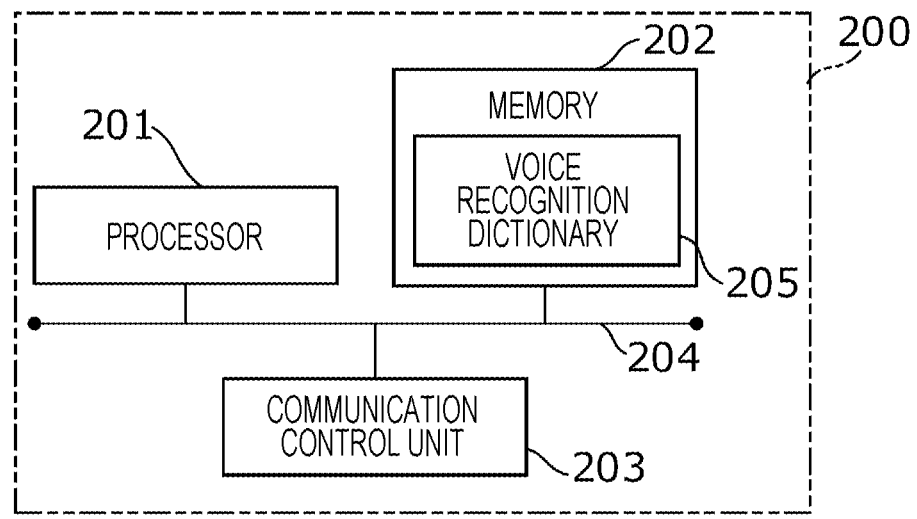

VOICE-BASED AUTHENTICATION AFTER SUCCESSFUL AUTHENTICATION BASED ON NON-VOICE INPUT

CROSS-REFERENCE TO RELATED APPLICATIONS

This application is based on and claims priority under 35 USC 119 from Japanese Patent Application No. 2020-110697 filed Jun. 26, 2020.

BACKGROUND

(i) Technical Field

The present disclosure relates to an information processing apparatus and a non-transitory computer readable medium.

(ii) Related Art

Techniques for authenticating a user and operating an apparatus using voice are known. In Japanese Unexamined Patent Application Publication No. 2007-193138, for example, a technique is described in which a voice of a user is recognized, a keyword is extracted from the voice, and if the keyword and a keyword registered in a voiceprint pattern file match, an operation for forming an image is performed in accordance with an instruction indicated by a voice of the user in interactive communication with the user. In Japanese Unexamined Patent Application Publication No. 2007-188001, a technique is described in which a voice of a user is obtained, voiceprint authentication is performed, and a process is performed in accordance with text data obtained by recognizing the voice. In Japanese Unexamined Patent Application Publication No. 2017-28355, a technique is described in which a voice is received as a person approaches, the voice is recognized, a command is generated, and power is supplied to a function unit in order to execute the command. In Japanese Unexamined Patent Application Publication No. 2002-279245, a technique is described in which a service center receives voice data including information indicating an order for a product or the like from a mobile device over a communication network, the order is recognized from the input voice data, and a user who has placed the order for the product or the like is authenticated from the input voice data.

SUMMARY

After a user is authenticated, the user might perform an operation using a voice. If the user is authenticated only at a beginning of use in this case, a stranger who is pretending to be the user might illicitly perform an operation using a voice after the user is authenticated. In order to suppress such an illicit operation, the user may be authenticated on the basis of a voice uttered by the user to perform an operation, for example, in addition to the authentication of the user at the beginning of use. If a feature of the voice of the user is compared with features of voices of all users in order to authenticate the user in this case, however, a processing load caused by the authentication of the user becomes too heavy.

Aspects of non-limiting embodiments of the present disclosure relate to suppression, with a small processing load, of an operation illicitly performed by a stranger who is pretending to be a user after the user is authenticated in first authentication, compared to when the user is authenticated by comparing a feature of a voice of the user used for an operation with features of voices of all users.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to obtain a registered first voice of a first user identified in first authentication achieved by an authentication method different from an authentication method employing a voice, obtain a second voice uttered by a second user during operation, perform second authentication for confirming that the second user is the first user identified in the first authentication by comparing a feature of the first voice and a feature of the second voice, and perform, if the second authentication is successfully completed, a process in accordance with an operation associated with the second voice.

BRIEF DESCRIPTION OF THE DRAWINGS

An exemplary embodiment of the present disclosure will be described in detail based on the following figures, wherein:

FIG. 3 is a diagram illustrating an example of a server apparatus;

FIG. 4 is a diagram illustrating an example of a voice recognition dictionary;

DETAILED DESCRIPTION

1. Configuration

Figure 1:
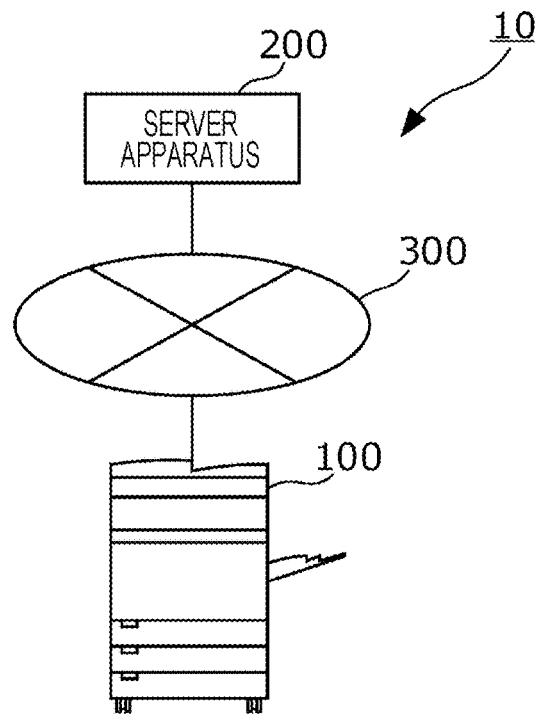
FIG. 1 is a diagram illustrating the configuration of an image processing system according to an exemplary embodiment.

FIG. 1 is a diagram illustrating the configuration of an image processing system 10 according to an exemplary embodiment. The image processing system 10 authenticates a user on the basis of a voice and receives an operation performed by the user using a voice. More specifically, in order to suppress an operation illicitly performed by a stranger who is pretending to be the user after the user is successfully authenticated in first authentication, second authentication is performed using a voice uttered by the user to perform an operation. The image processing system 10 includes an image processing apparatus 100 and a server apparatus 200. The image processing apparatus 100 and the server apparatus 200 are connected to each other over a communication network 300. The communication network 300 includes, for example, the Internet.

Figure 2:
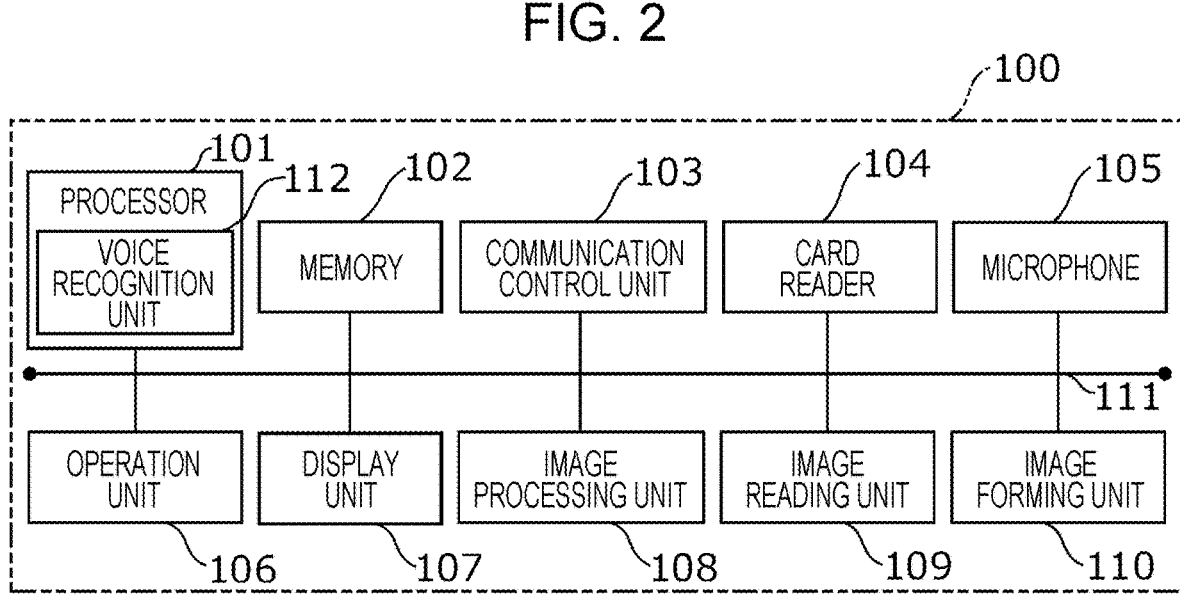
FIG. 2 is a diagram illustrating an example of the configuration of an image processing apparatus.

FIG. 2 is a diagram illustrating an example of the configuration of the image processing apparatus 100. The image processing apparatus 100 has plural image processing functions such as a copy function, a print function, and a scan function. The image processing apparatus 100 also has a function of authenticating the user on the basis of a voice.

The image processing apparatus 100 is an example of an information processing apparatus in the present disclosure. The image processing apparatus 100 includes a processor 101, a memory 102, a communication control unit 103, a card reader 104, a microphone 105, an operation unit 106, a display unit 107, an image processing unit 108, an image reading unit 109, and an image forming unit 110. These components are connected to one another by a bus 111.

The processor 101 executes a program to control the other components of the image processing apparatus 100 and achieves functions of the image processing apparatus 100. A central processing unit (CPU), for example, is used as the processor 101. The processor 101 also functions as a voice recognition unit 112 by executing the program. The voice recognition unit 112 authenticates the user on the basis of a voice. The memory 102 stores the program executed by the processor 101. A random-access memory (RAM) and a read-only memory (ROM), for example, are used as the memory 102. The memory 102 may also include a storage such as a hard disk drive (HDD) or a solid-state drive (SSD). The communication control unit 103 controls communication of data with other apparatuses connected over the communication network 300. The other apparatuses may include the server apparatus 200 and terminal apparatuses (not illustrated) used by the user and a manager.

The card reader 104 reads card information from an integrated circuit (IC) card. The card information is used for the first authentication performed at a beginning of use. A near-field communication (NFC) reader, for example, is used as the card reader 104. The microphone 105 obtains a voice uttered by the user. The voice is used for an operation performed on the image processing apparatus 100 and the second authentication, which is performed after the first authentication. The operation unit 106 receives an operation performed by the user. The operation unit 106 is used to operate the image processing apparatus 100 if the second authentication fails. A touch panel and operation buttons, for example, are used as the operation unit 106. The display unit 107 displays various screens used to communicate information with the user. A liquid crystal display, for example, is used as the display unit 107. The image processing unit 108 performs various types of image processing on images. An image processing circuit, for example, is used as the image processing unit 108. The image reading unit 109 reads a document image and converts the document image into a digital image. The image reading unit 109 achieves the scan function. An image scanner, for example, is used as the image reading unit 109. The image forming unit 110 forms images on a medium. The image forming unit 110 achieves the print function. The image reading unit 109 and the image forming unit 110 together achieve the copy function. A printer, for example, is used as the image forming unit 110.

FIG. 3 is a diagram illustrating an example of the server apparatus 200. The server apparatus 200 performs the first authentication for the user on the basis of the IC card and a voice recognition process for recognizing a voice of the user. The voice recognition process is performed using a known voice recognition technique. Because a processing load caused by a voice recognition process for recognizing natural language is heavy, not the image processing apparatus 100 but the server apparatus 200, which has high processing performance, performs the voice recognition process in the present exemplary embodiment. The server apparatus 200 includes a processor 201, a memory 202, and a communication control unit 203. These components are connected to one another by a bus 204.

The processor 201 executes a program to control the other components of the server apparatus 200 and achieves functions of the server apparatus 200. A CPU, for example, is used as the processor 201. The memory 202 stores the program executed by the processor 201 and various pieces of data used to perform the voice recognition process and authenticate the user. The data used to perform the voice recognition process includes a natural language dictionary. A RAM and a ROM, for example, are used as the memory 202. The memory 202 may also include a storage such as an HDD or an SSD. The communication control unit 203 controls communication of data with the image processing apparatus 100 connected over the communication network 300.

FIG. 4 is a diagram illustrating an example of a voice recognition dictionary 205. The voice recognition dictionary 205 includes user identifiers (IDs) and features of voices of users used for certain operations. The user IDs are information for uniquely identifying the users. The user IDs are each associated with features of voices of a user corresponding to the user ID. Features of voices of a user are features of voices that have been uttered by the user to perform certain operations, respectively. In the image processing apparatus 100, an operation for selecting one of the functions of the image processing apparatus 100 is invariably performed. Such a basic operation is used as a certain operation. An operation word is set in advance for each of the certain operations. The operation words for the certain operations include, for example, "copy", which is used for an operation for selecting the copy function of the image processing apparatus 100, "scan", which is used for an operation for selecting the scan function, and "print", which is used for an operation for selecting the print function. In this case, the user registers a voice indicating the operation word "copy", a voice indicating the operation word "scan", and a voice indicating the operation word "print", for example, before using the image processing apparatus 100. When the user has registered the voices, the voices are subjected to Fourier transforms, and an image indicating frequency characteristics is generated. The image generated in this manner and images indicating frequency characteristics obtained by performing Fourier transforms on voices uttered by a large number of unspecified persons other the user are subjected to machine learning, and features of the voices of the user are extracted. The features of the voices are, for example, voiceprints. When a new user is added, features of voices registered by the new users are added to the voice recognition dictionary 205.

2. Operation

When the processor 101 or 201 is described as performing a process in the following description, the processor 101 or 201 performs the process by performing arithmetic processing or controlling the operation of other hardware elements while executing the program stored in the memory 102 or 202.

Figure 5:
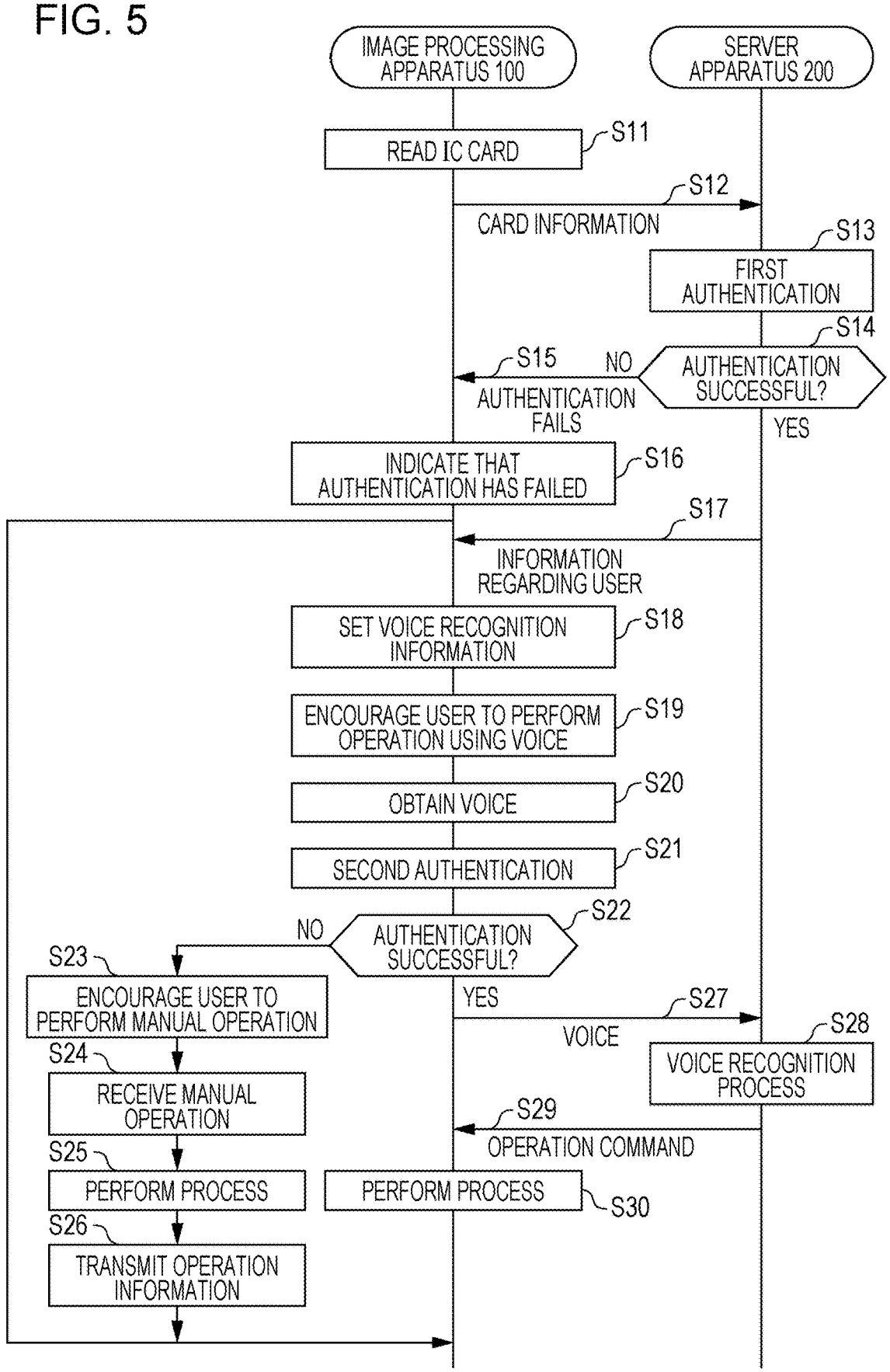
FIG. 5 is a sequence chart illustrating an example of the operation of the image processing system.

FIG. 5 is a sequence chart illustrating an example of the operation of the image processing system 10. The operation starts, for example, when the user begins to use the image processing apparatus 100. When beginning to use the image processing apparatus 100, the user holds the IC card thereof onto the card reader 104. In step S11, the processor 101 of the image processing apparatus 100 reads card information from the IC card using the card reader 104. As a result, the card information is obtained. In step S12, the processor 101 transmits the obtained card information to the server apparatus 200 using the communication control unit 103.

In step S13, the processor 201 of the server apparatus 200 receives the card information using the communication control unit 203 and performs the first authentication the on the basis of card information. The first authentication is an example first authentication in the present disclosure because the user is identified using an authentication method different from one in which a voice of the user is used. The memory 202 stores in advance card information recorded on IC cards of registered users while associating card information with user IDs of the registered users. If the card information stored in the memory 202 includes the card information obtained from an IC card of a user, a user corresponding to a user ID associated with the card information is identified, and the first authentication is successfully completed. The user identified in the first authentication is an example of a first user in the present disclosure. If the card information stored in the memory 202 does not include the card information obtained from the IC card of the user, on the other hand, the first authentication fails.

In step S14, the processor 201 determines whether the first authentication has been successfully completed. If the first authentication has failed (NO in step S14), the processor 201 causes the operation to proceed to step S15 and transmits an authentication result indicating that the first authentication has failed to the image processing apparatus 100. Upon receiving the authentication result, the processor 101 of the image processing apparatus 100 displays, in step S16, a message indicating that the first authentication has failed on the display unit 107 and ends the operation without performing later steps. In this case, the user is not permitted to use the image processing apparatus 100.

If the first authentication has been successfully completed in step S14 (YES in step S14), on the other hand, the processor 201 causes the operation to proceed to step S17 and transmits information regarding the user identified in the first authentication to the image processing apparatus 100 using the communication control unit 203. The information regarding the user includes voice recognition information regarding the user and an email address of the user. If user A has been identified in the first authentication, for example, features of voices associated with a user ID of user A are extracted from the voice recognition dictionary 205 illustrated in FIG. 4 and transmitted to the image processing apparatus 100 as the voice recognition information regarding the user. The voice recognition information regarding the user is an example of a first voice in the present disclosure since the voice recognition information regarding the user includes the features of the voices registered by the user. At this time, features of voices of other users are not transmitted to the image processing apparatus 100. The memory 202 stores in advance email addresses of the users while associating the email addresses with the user IDs of the users. If user A has been identified in the first authentication, for example, an email address associated with the user ID of user A is transmitted to the image processing apparatus 100.

In step S18, the processor 101 of the image processing apparatus 100 receives the information regarding the user using the communication control unit 103 and sets the voice recognition information included in the information regarding the user to the voice recognition unit 112. In step S19, the processor 101 displays, on the display unit 107, a message for encouraging the user to perform an operation using a voice. The user operates the image processing apparatus 100 using a voice. The user who utters a voice in this operation is an example of a second user in the present disclosure. The voice used in this operation includes, for example, an operation word for a certain operation for selecting a function and an operation word for an operation for setting a setting value of the function. The words indicated by the voice of the user may be in natural language. When the user desires to obtain three color copies of a document image, for example, the user says, "Three color copies". In step S20, the processor 101 obtains, using the microphone 105, the voice uttered by the user. The voice is an example of a second voice in the present disclosure. The obtained voice of the user is stored in the memory 102.

Figure 6:
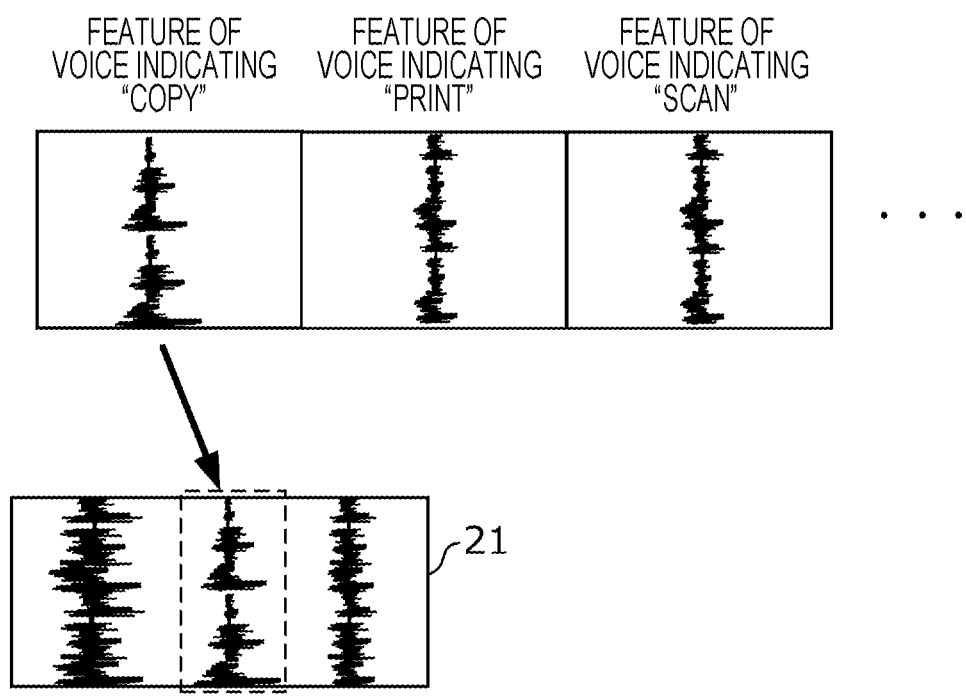
FIG. 6 is a diagram illustrating an example of an image indicating frequency characteristics of voices of a user.

In step S21, the processor 101 performs the second authentication on the basis of the obtained voice of the user. In the second authentication, it is confirmed that the user who is operating the image processing apparatus 100 using voices is the user identified in the first authentication. The second authentication is an example of second authentication in the present disclosure. First, the voice of the user is subjected to a Fourier transform, for example, and an image 21 indicating frequency characteristics is generated. FIG. 6 is a diagram illustrating an example of the image 21 indicating the frequency characteristics of voices of the user. Next, features of the voices indicated by the generated image 21 and the features of the voices included in the voice recognition information regarding the user are compared with each other. In the example illustrated in FIG. 6, the features of the voices indicated by the image 21 include the feature of the voice indicating "copy" included in the voice recognition information regarding the user. In this case, the second authentication is successfully completed. If the features of the voices indicated by the image 21 do not include any of the features of the operation words included in the voice recognition information regarding the user, on the other hand, the second authentication fails.

In step S22, the processor 101 determines whether the second authentication has been successfully completed. If the second authentication has failed (NO in step S22), the processor 101 causes the operation to proceed to step S23 and displays, on the display unit 107, a message for encouraging the user to perform a manual operation. In this case, the user operates the image processing apparatus 100 using the operation unit 106. For example, the user performs an operation for requesting three color copies of the document image using the operation unit 106. In step S24, the processor 101 receives the manual operation performed by the user using the operation unit 106. In step S25, the processor 101 performs a process in accordance with the manual operation. For example, the image reading unit 109 and the image forming unit 110 obtain three color copies of the document image. In step S26, the processor 101 transmits operation information indicating the manual operation performed using the operation unit 106 to the email address of the user. The operation information may include image information indicating an image processed in accordance with the manual operation. The email address is included in the information regarding the user received from the server apparatus 200. The email address is an example of a predetermined transmission destination in the present disclosure.

A reason why the process according to the operation performed by the user is performed even after the second authentication fails is that convenience decreases if the image processing apparatus 100 is not available when the user's voice is temporarily different from the registered one due to a cold, a sore throat, or the like, for example, since the first authentication has been successfully completed. Even if a stranger who is pretending to be the user operates the image processing apparatus 100 in this case, the user understands that the stranger has performed an illicit operation since operation information indicating details of the operation performed by the stranger is transmitted to the email address of the user.

If the second authentication has been successfully completed in step S22 (YES in step S22), on the other hand, the processor 101 causes the operation to proceed to step S27 and transmits the voice of the user stored in the memory 102 to the server apparatus 200 using the communication control unit 103. That is, the voice of the user is transmitted to the server apparatus 200 only if the second authentication is successfully completed. If the second authentication fails, the voice of the user is not transmitted to the server apparatus 200.

In step S28, the processor 201 of the server apparatus 200 receives the voice of the user using the communication control unit 203 and performs a voice recognition process on the voice. In the voice recognition process, the voice is converted into text, and operation words are extracted from the voice by recognizing the voice using the natural language dictionary. An operation command is then generated in accordance with the operation words. Operation commands are stored in the memory 202 in advance while being associated with operation words. An operation command is generated from the operation words on the basis of the association. When operation words "color", "copy", and "three" have been extracted from a voice, "Three color copies", for example, an operation command for requesting three color copies of the document image is generated.

In addition to the number of copies and color, there are plural setting values for copying, such as a surface of a document to be read and resolution. The user, however, might utter a voice including only operation words corresponding to an operation for setting a part of these setting values. In this case, the voice of the user includes only the operation words corresponding to the operation for setting a part of these setting values and does not include operation words corresponding to an operation for setting other setting values. Predetermined setting values, therefore, are used for the setting values corresponding to the operation words that are not included in the voice of the user. Such setting values may be initial values or determined by the user in advance. The setting values determined by the user in advance may be stored in the memory 202 of the server apparatus 200, for example, and the server apparatus 200 may transmit the setting values to the image processing apparatus 100 as information regarding the user. In this case, an operation command is generated on the basis of the setting values corresponding to the operation words included in the voice of the user and the other setting values determined in advance. If the user says, "Three color copies", during operation and a predetermined surface of a document to be read is a single side and predetermined resolution is 200 dpi, for example, an operation command for obtaining three color copies of one side of the document image with a resolution of 200 dpi is generated.

In step S29, the processor 201 transmits the generated operation command to the image processing apparatus 100 using the communication control unit 203. In step S30, the processor 101 of the image processing apparatus 100 receives the operation command using the communication control unit 103 and performs a process in accordance with the operation command. For example, the image reading unit 109 and the image forming unit 110 perform a process for obtaining three color copies of one side of the document image with a resolution of 200 dpi in accordance with the operation command. When the process is completed, the operation ends.

According to the above exemplary embodiment, the second authentication is performed using a voice uttered by the user during operation after the first authentication. An operation illicitly performed by a stranger who is pretending to be the user, therefore, is suppressed. In addition, the second authentication is performed using voice recognition information regarding the user identified in the first authentication. A processing load caused by the second authentication, therefore, is smaller than when the second authentication is performed while comparing a feature of a voice of the user with the features of the voices of all the users included in the voice recognition dictionary 205. Time taken to complete the second authentication is also reduced. In addition, in the second authentication, the feature of the voice of the user may be compared with the features of the voices included in the voice recognition information regarding the user identified in the first authentication, that is, the voice of the user need not be identified by comparing the feature of the voice of the user with the features of the voices of all the users included in the voice recognition dictionary 205. The processing load caused by the second authentication, therefore, is reduced, thereby reducing the time taken to complete the second authentication and suppressing erroneous authentication. Since the processing load caused by the second authentication is reduced, the image processing apparatus 100 may perform the second authentication. In addition, the second authentication is performed using the voice recognition information regarding the user. It is therefore only required that, when a new user is added, voices of the new user be registered, and voices of existing users need not be subjected to machine learning again.

In addition, the second authentication is successfully completed if features of voices of the user indicating operation words for certain operations include a registered feature of a voice of the user indicating an operation word for a certain operation. The voice of the user, therefore, need not be divided into words and operation words for certain operations need not be extracted from the obtained words. As a result, the processing load caused by the second authentication is smaller than when such a process is performed. Furthermore, when a voice of the user includes only operation words corresponding to an operation for setting a part of plural setting values to be used for a process, an operation command is generated on the basis of the setting values and other setting values determined in advance. The user, therefore, may perform the process without setting, using a voice, all the setting values to be used for the process.

Furthermore, if the second authentication fails, operation information indicating an operation performed by the user using the operation unit 106 is transmitted to the email address of the user. The user, therefore, understands an operation performed using the operation unit 106 if the second authentication fails. Furthermore, if the second authentication fails, a voice of the user is not transmitted to the server apparatus 200. An unnecessary voice, therefore, is not transmitted to the server apparatus 200. In this case, the voice of the user is not transmitted to the outside of the image processing apparatus 100, and information security improves.

3. Modifications

The present disclosure is not limited to the above exemplary embodiment. The above exemplary embodiment may be modified as in the following examples and implemented, instead. At this time, two or more of the following examples may be combined together and implemented.

In the above exemplary embodiment, an authentication method used in the first authentication is not limited to that in which an IC card is used. Any authentication method may be used in the first authentication insofar as the authentication method does not employ the user's voice. For example, the authentication method used in the first authentication may be one employing a face image of the user obtained by a camera or one employing biological information regarding the user, such as a fingerprint, an iris, a hand vein, instead.

In the above exemplary embodiment, the transmission destination to which operation information indicating an operation performed by the user using the operation unit 106 is transmitted if the second authentication fails is not limited to the email address of the user. For example, the transmission destination of operation information may be a terminal apparatus used by the manager of the image processing apparatus 100, instead. In addition, execution of a process need not necessarily be permitted if the second authentication fails. If the second authentication fails, for example, execution of a process may be inhibited, instead.

In the above exemplary embodiment, plural operation words may be defined for a single operation, instead. When the user performs an operation for selecting the print function, for example, the user might say, "Print", or might say, "Printing". Both an operation word "print" and an operation word "printing" may be associated with an operation for selecting the print function so that the operation for selecting the print function is performed in either case. In this case, the user registers both a voice indicating the operation word "print" and a voice indicating the operation word "printing" in advance so that the second authentication is performed regardless of whether the user says, "Print" or "Printing". The voice recognition dictionary 205 includes both a feature of the voice indicating the operation word "print" and a feature of the voice indicating the operation word "printing".

In the above exemplary embodiment, the information processing apparatus in the present disclosure is not limited to the image processing apparatus 100. The information processing apparatus in the present disclosure may be any apparatus insofar as the apparatus performs authentication on the basis of a voice and receives an operation on the basis of a voice, such as a printer, an image scanner, a copier, a fax machine, a smartphone, a tablet terminal, a personal computer, an audio device, or a gaming device. In this case, the certain operation may be an operation invariably performed by the user when the user performs a process using the information processing apparatus. When the user performs a process using a personal computer, for example, the user invariably opens a file. In this case, the certain operation may be the opening of a file. An operation word corresponding to the certain operation may be a word that hardly varies depending on a person, time, or a place.

The configuration of the image processing apparatus 100 described in the above exemplary embodiment is an example, and the configuration of the image processing apparatus 100 is not limited to this example. For example, the voice recognition unit 112 may be achieved by a dedicated circuit instead of the processor 101. In addition, the image processing apparatus 100 and the server apparatus 200 need not necessarily be separately provided. For example, the image processing apparatus 100 may have the functions of the server apparatus 200. In this case, the server apparatus 200 need not be provided.

In the above exemplary embodiment, at least a part of the processes performed by the image processing apparatus 100 may be performed by another apparatus, instead. Furthermore, the above-described order of steps performed by the image processing apparatus 100 is an example, and the order may be changed insofar as no contradiction is caused.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The present disclosure may be implemented as a program to be executed by the image processing apparatus 100. The image processing apparatus 100 is an example of a computer in the present disclosure. The program may be downloaded over a communication network such as the Internet or may be stored in a computer readable storage medium such as a magnetic storage medium (a magnetic tape, a magnetic disk, etc.), an optical storage medium (an optical disc, etc.), a magneto-optical storage medium, or a semiconductor memory and provided.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to
obtain, from a server that is separate and different from the information processing apparatus and stores a plurality of registered voices corresponding to a plurality of users, a registered first voice of a first user identified in first authentication achieved by an authentication method different from an authentication method employing a voice, and not obtain from the server any other registered voices among the plurality of registered voices,
obtain a second voice uttered by a second user during operation,
perform second authentication for confirming that the second user is the first user identified in the first authentication by comparing a feature of the first voice and a feature of the second voice without comparing the second voice to any other registered voices other than the first voice, and
perform, if the second authentication is successfully completed, a process in accordance with an operation associated with the second voice.

2. The information processing apparatus according to claim 1,
wherein the second voice is associated with a certain operation, and wherein, if the feature of the second voice includes the feature of the first voice, the second authentication is successfully completed.

3. The information processing apparatus according to claim 1,
wherein the process is configured to, if the second authentication fails,
receive an operation performed using an operator,
perform a process in accordance with the operation performed using the operator, and
transmit operation information indicating the operation performed using the operator to a predetermined transmission destination.

4. The information processing apparatus according to claim 1,
wherein the processor is configured to, in a case where the second voice is associated with an operation for setting a part of a plurality of setting values to be used for the process, perform the process in accordance with the part of the plurality of setting values and other setting values determined in advance.

5. The information processing apparatus according to claim 4,
wherein the other setting values are determined in advance for the first user identified in the first authentication.

6. The information processing apparatus according to claim 1,
wherein the processor is configured to, if the second authentication is successfully completed, transmit the second voice to the server that performs a process for recognizing the second voice.

7. The information processing apparatus according to claim 1,
wherein the processor is configured to, if the second authentication fails, not transmit the second voice to the server that performs a process for recognizing the second voice.

8. A non-transitory computer readable medium storing a program causing a computer to execute a process comprising:
obtaining, from a server that is separate and different from the information processing apparatus and stores a plurality of registered voices corresponding to a plurality of users, a registered first voice of a first user identified in first authentication achieved by an authentication method different from an authentication method employing a voice, and not obtaining from the server any other registered voices among the plurality of registered voices,
obtaining a second voice uttered by a second user during operation,
performing second authentication for confirming that the second user is the first user identified in the first authentication by comparing a feature of the first voice and a feature of the second voice without comparing the second voice to any other registered voices other than the first voice, and
performing, if the second authentication is successfully completed, a process in accordance with an operation associated with the second voice.

9. An information processing method to be performed by a computer, the method comprising:
obtaining, from a server that is separate and different from the information processing apparatus and stores a plurality of registered voices corresponding to a plurality of users, a registered first voice of a first user identified in first authentication achieved by an authentication method different from an authentication method employing a voice, and not obtaining from the server any other registered voices among the plurality of registered voices,
obtaining a second voice uttered by a second user during operation,
performing second authentication for confirming that the second user is the first user identified in the first authentication by comparing a feature of the first voice and a feature of the second voice without comparing the second voice to any other registered voices other than the first voice, and
performing, if the second authentication is successfully completed, a process in accordance with an operation associated with the second voice.

* * * * *